United States Patent [19]
Pusic

[11] Patent Number: 5,537,888
[45] Date of Patent: Jul. 23, 1996

[54] CONSTANT-MESH MANUAL/AUTOMATIC TRANSMISSION

[76] Inventor: Pavo Pusic, 463 First St. Unit 6C, Hoboken, N.J. 07030

[21] Appl. No.: 323,254

[22] Filed: Oct. 14, 1994

[51] Int. Cl.⁶ .................................................. F16H 3/08
[52] U.S. Cl. ........................ 74/371; 74/372; 475/206
[58] Field of Search ................. 74/371, 372; 192/93 C; 475/206, 207

[56] References Cited

U.S. PATENT DOCUMENTS

| | | | |
|---|---|---|---|
| 1,661,892 | 3/1928 | Girones | 74/371 |
| 1,664,303 | 3/1928 | Mayer | 74/371 |
| 2,273,807 | 2/1942 | Woytych | 74/371 |
| 3,893,350 | 7/1975 | Gingras | 74/372 X |

FOREIGN PATENT DOCUMENTS

| | | | |
|---|---|---|---|
| 1003115 | 3/1952 | France | 74/372 |
| 22657 | 2/1977 | Japan | 75/371 |
| 86962 | 7/1978 | Japan | 74/372 |
| 13120 | 11/1913 | United Kingdom | 74/372 |

*Primary Examiner*—Khoi Q. Ta
*Attorney, Agent, or Firm*—Marks & Murase

[57] ABSTRACT

A constant-mesh manual/automatic transmission is disclosed. The transmission comprises a set of drive gears and a set of driven gears wherein each of drive gears constantly meshes with its counterpart of driven gears thereby enabling a plurality of the drive and driven gears to be packed within a reasonably small volume. The plurality of the drive and driven gears provides for a smooth power flow and decrease of energy loss.

13 Claims, 6 Drawing Sheets

5,537,888

CONSTANT-MESH MANUAL/AUTOMATIC TRANSMISSION

FIELD OF THE INVENTION

The present invention relates to manual, semi-automatic, and automatic transmissions used in different vehicles and equipment.

BACKGROUND OF THE INVENTION

A transmission is a speed and power changing device for changing the ratio between an engine operating speed and driving wheel operating speed to best meet each particular driving situation. Each vehicle is equipped either with a manual, automatic or semi-automatic transmission.

Manual transmissions are equipped with a clutch which connects and disconnects a driving force from a driven member. A shift lever is used to manually change the power flow from different drive gears to different driven gears so as to vary an output operating speed. These transmissions have relatively simple and reliable mechanical design but require more driver skill which makes them unpopular in some markets. Another disadvantage of manual transmissions is clutch wear and tear which occurs over time and requires clutch replacement. Bicycles are equipped with manual transmissions which apply a drive chain for connecting driving and driven members and changing the ratio between pedalling speed and wheel operating speed.

Except for simple motorcycles (such as mopeds and motor-scooters), automatic transmissions are of relatively complicated design but require minimum driver skill and, consequently, are very popular in the U.S. market. Instead of a clutch, they apply a torque converter to connect and disconnect a driving force from a driven member.

Gear ratios in, both, manual and automatic transmissions have significantly different values and, thus, engine speed cannot be kept at optimum level at all times resulting in a related energy loss. Bicycle transmissions have an extensive range of ratios but during every shifting require a chain relocation from one gear to another which also results in power loss.

Therefore, it is an object of the present invention to provide such transmission which will be power efficient, simple to maintain, and comfortable to use.

SUMMARY OF THE INVENTION

The present invention comprises one set of drive gears and one set of driven gears which are in a constant-mesh position. The set of drive gears is mounted on a drive shaft and comprises the gears having different diameters which all rotate together with the drive shaft. The set of driven gears also comprises the gears having different diameters which rotate independently on an output shaft. Each one of the drive gears constantly meshes with its counterpart member of the driven gears. Both sets are stationary with respect to a transmission housing, i.e. there is no sliding motion of any gear.

The set of driven gears is mounted on the output shaft which houses roll-keys, intermediate balls, and one shifting plunger. The intermediate balls and roll-keys are mounted laterally through the shaft and they are displaced by the shifting plunger which slides longitudinally through the shaft. One set of intermediate balls and roll-keys is provided for each gear and each set of roll-keys is retracted by a pair of circular springs. The shifting plunger is driven through the shaft by a guidance cord which is connected to the plunger and extends through both ends of the shaft. Both ends of the guidance cord are connected to a command unit which can be controlled either by manual or automated means.

According to the process of the present invention, when the command unit is turned to left or right it pulls the guidance cord which causes the shifting plunger to enter between one set of the intermediate balls. The shifting plunger displaces the balls which further displace the roll-keys causing them to partially extend out of the shaft and enter within the notches which are located along the inside circle of the gear. When the roll-keys enter into the notches they lock the shaft to the particular gear thereby causing the power flow through this gear. Once the shifting plunger is moved, the force of the retracting springs returns the roll-keys and intermediate balls into their staffing position. This causes the shaft to disengage from the gear and the power flow is cut. By driving the shifting plunger through the output shaft the power flow is shifted from one to another gear and, consequently, the different output speeds are attained.

Since the driven gears are rotating on the output shaft without any resistance, their permanent motion will not cause almost any loss of energy. On the other hand, elimination of sliding movement of any corresponding member (except the shifting plunger) enables the process with minimum power loss and the most compact design. A plurality of gears enables a very small difference between ratios of the neighbouring gears and a very smooth operation. The shifting plunger can be moved both manually and by some kind of automated device which controls the movement of the command unit.

In sum, the present invention provides the transmission which can be very compact, simple in design, energy efficient, and operated either manually or automatically. Also, it can be efficiently used in any vehicle regardless of its size or power source and provide as many gears as necessary within a reasonably small volume and without any unacceptable increase of weight.

All features and advantages of the present invention will become apparent from the following brief description of the drawings and the description of the preferred embodiment.

DETAIL DESCRIPTION OF THE PREFERRED EMBODIMENT

Figure 1:
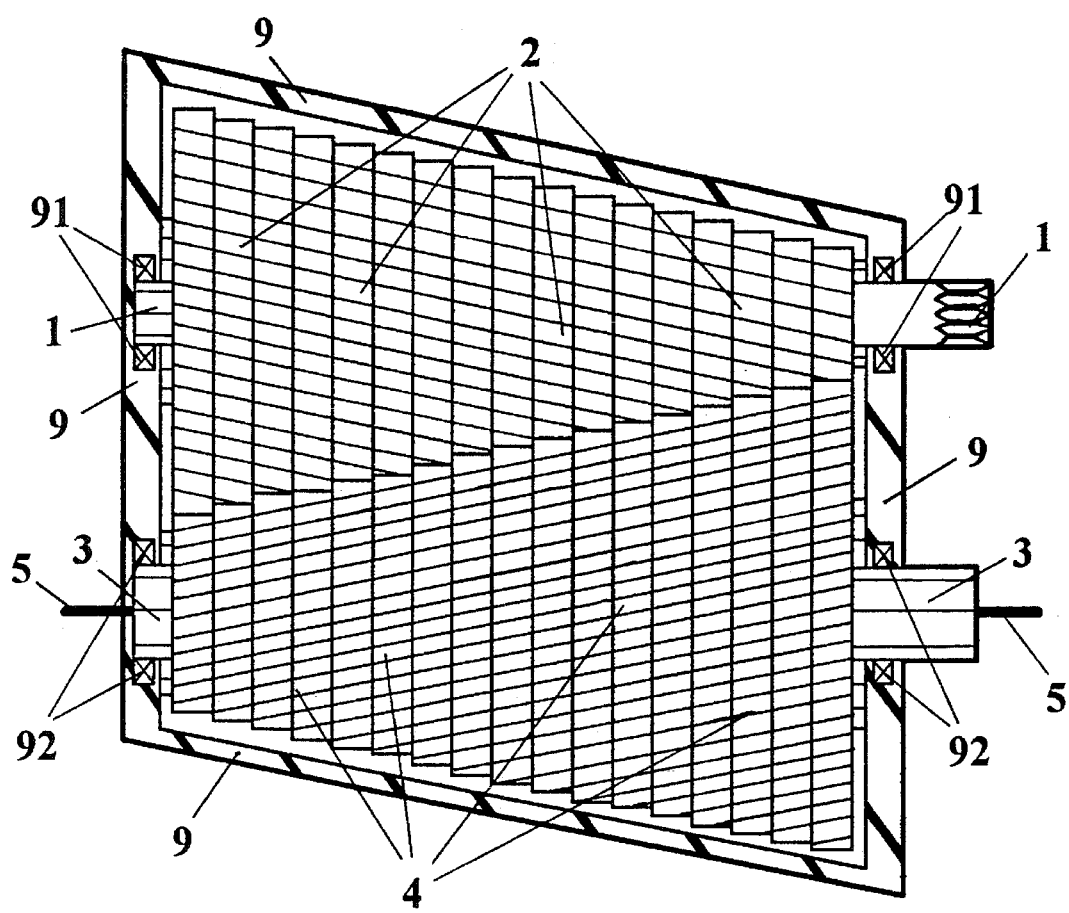
FIG. 1 the top view of the invention showing the arrangement of the drive and driven gears, and drive and output shaft.
Figure 8:
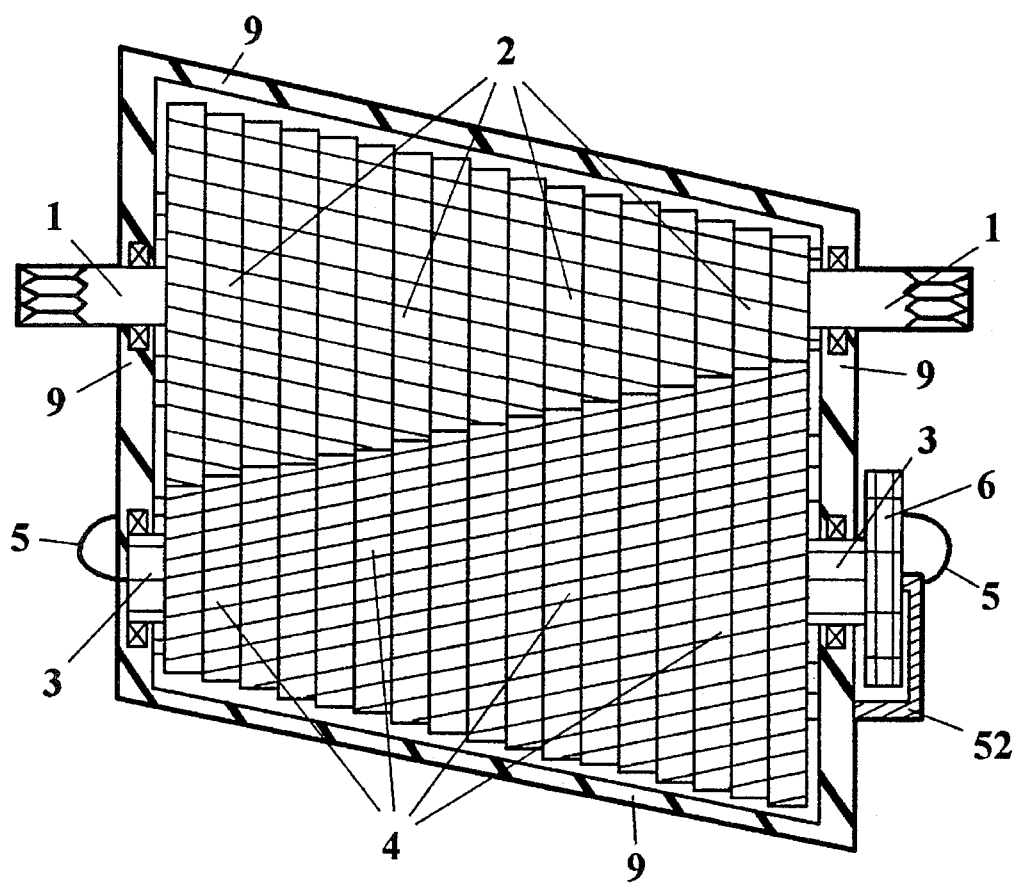
FIG. 8 is the top view of the invention showing the arrangement as proposed for use in a bicycle or moped.
Figure 9:
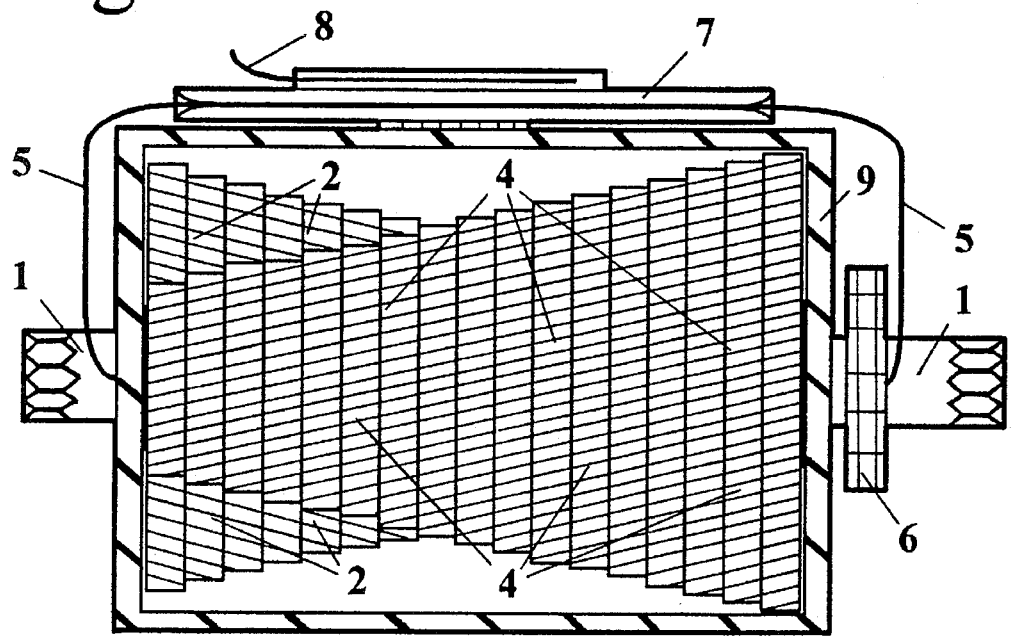
FIG. 9 is the back view of the invention as proposed for use in bicycle or moped.

As shown in FIGS. 1, 8, and 9, the present invention comprises two sets of gears 2 and 4 mounted on two shafts 1 and 3 and enclosed within the housing 9. The first set of gears 2, hereinafter identified as drive gears, is mounted on the drive shaft 1 which is rotated by some external power. The drive gears 2 have different diameters and are firmly attached to the drive shaft 1 so as to prevent any sliding motion. The drive shaft 1 is also firmly attached to the housing and it is able only to rotate inside the bail-bearings 91. Consequently, both the shaft 1 and the gears 2 rotate together and do not change their position with respect to the housing 9. One end of the drive shaft 1 extends from the housing while the other end is secured inside the housing wall 9 as shown in FIG. 1.

Figure 4:
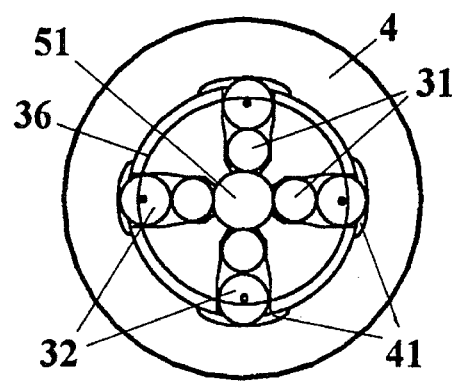
FIG. 4 is the lateral cut-away view of the output shaft and the driven gear showing the arrangement of roll-keys, the retracting spring, and intermediate balls in their extended position.

Second set of gears 4, hereinafter identified as driven gears, is mounted on the output shaft 3 as shown in FIGS. 1, 2, 8, and 9. The driven gears 4 are mounted on the output shaft 3 in a manner which allows each of them to freely rotate on the shaft 3 as shown in FIG. 4. Each of the driven gears 4 is in a constant-mesh position with its counterpart of the drive gears 2. The output shaft 3 is firmly attached to the housing 9 in a manner which does not allow any sliding movement neither of the shaft 3 nor of the gears 4 with respect both to the housing and the drive gears 2. Each of the driven gears 4 has a different diameter which, when engaged, causes the shaft 3 to rotate at a different speed. The output shaft 3 is inserted and rotates within the ball-bearings 92 as shown in FIGS. 1, 2, 8, and 9. One end of the output shaft 3 extends from the housing 9 and the other end is secured inside the housing wall as shown in FIGS. 1, 2, 8, and 9.

Figure 2:
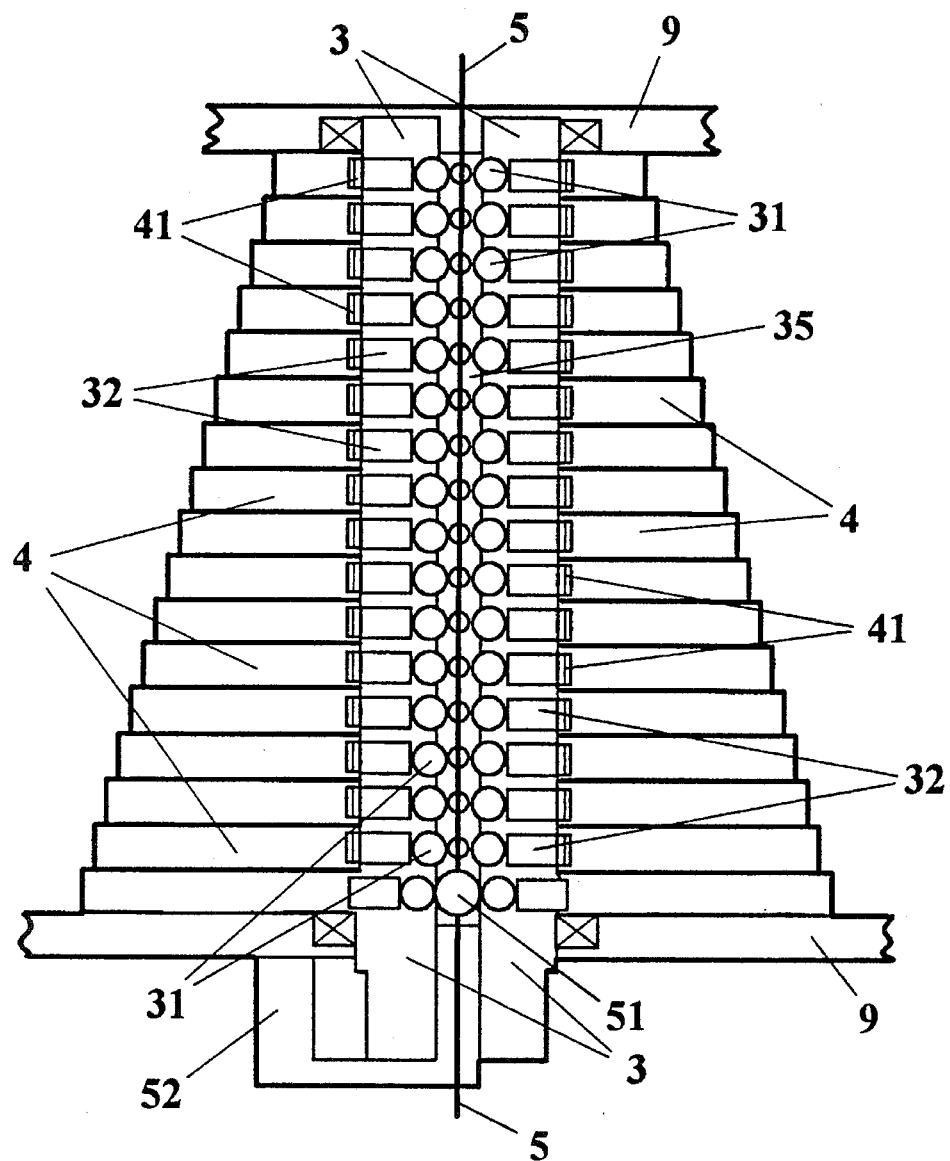
FIG. 2 is the longitudinal cut-away view of the output shaft and driven gears.
Figure 3:
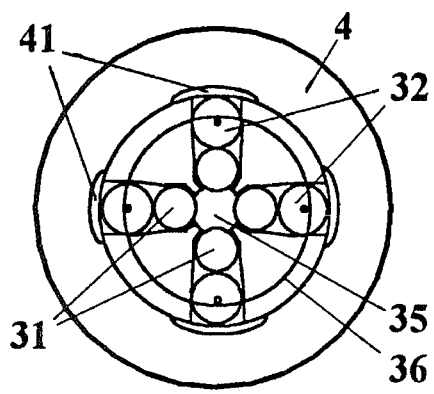
FIG. 3 is the lateral cut-away view of the output shaft and the driven gear showing the arrangement of roll-keys, the retracting spring, and intermediate balls in their retracted position.
Figure 5:
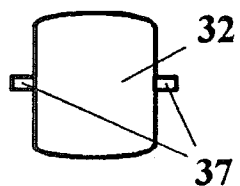
FIG. 5 is the view of the roll-key and its pins.
Figure 7:
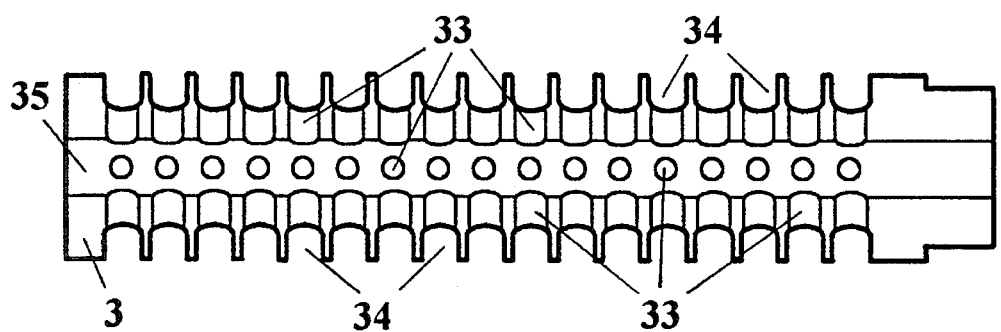
FIG. 7 is the cut-away view of the output shaft showing the arrangement of the openings which house the shifting plunger, intermediate balls, and roll-keys.

Each of the driven gears 4 has four symmetrically spaced notches 41 indented within its inner circumference as shown in FIGS. 2, 3, and 4. The output shaft 3 has one longitudinal opening 35 which extends along the entire shaft 3 as shown in FIGS. 2, 3 and 7. The output shaft 3 also has four symmetrically located lateral openings 33 and 34 as shown in FIGS. 2, 3, and 4. One set of these openings 33 and 34 is located within the area which corresponds to one driven gear 4 as shown in FIG. 2. The openings 33 house the intermediate balls 31, and the openings 34 house the roll-keys 32 and retracting springs 36 as shown in FIGS. 2, 3, and 4. The retracting springs 36 are mounted on the pins 37 which extend on both sides of each roll-key 32 as shown in FIGS. 3, 4, and 5.

Figure 6:
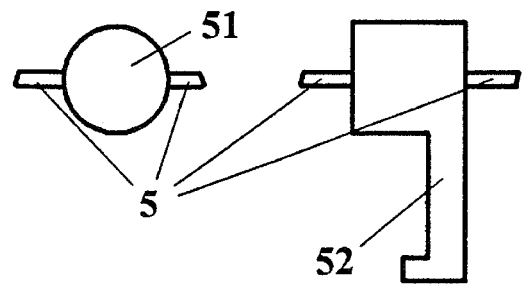
FIG. 6 is the side view of the shifting plunger, guidance cord, and guidance cord supporting unit.
Figure 10:
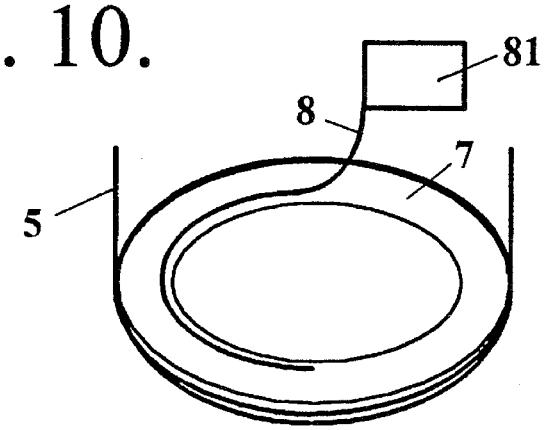
FIG. 10 is the panoramic view of the shilling command unit.

The shifting plunger 51, shown in FIGS. 2, 4, and 6, is located inside the output shaft opening 35 and firmly connected onto the guidance cord 5. The plunger 51 tightly fits the opening 35 and can be moved along this opening by the pulling/pushing force of the guidance cord 5. One end of the opening 35 is enclosed by the round retainer 52 and the other end and by the housing wall 9 as shown in FIG. 2 and 8. As shown in FIGS. 2, and 8, the retainer 52 limits the movement of the plunger 51, so as to prevent the plunger 51 to be pulled out from the opening and the retainer 52 is kept stationary with respect to the housing 9. The guidance cord 5 extends through the retainer 52 and the housing wall 9 and has both of its ends attached to the command unit 7 shown in FIGS. 9 and 10. The shifting cord 8, shown in FIGS. 9 and 10, extends from the command unit 7 and is attached to a manually operated lever. In the case of automated shifting, the command unit 7 can be operated by an electric stepping motor 81 as shown in FIG. 10.

Figure 11:
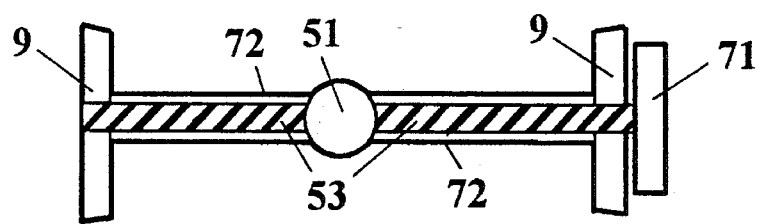
FIG. 11 is the side view of the helical plunger driver unit.

An alternate proposal of the present invention is to provide a shifting plunger's driving shaft 53 instead of the guidance cord 5. This design applies the shifting plunger's driving shaft 53 having a helical indentation and is mounted onto a disc 71 as shown in FIG. 11. The shifting plunger 51 is kept in the same position by two bars 72 which prevent its rotation and, consequently, force the plunger 51 to move through the opening 35 when the disc 71 and the driving shaft 53 are rotated.

In the case when the invention is used in a vehicle which is powered by pedals, such as a bicycle or moped, the drive shaft 1 extends through both sides of the housing as shown in FIGS. 8 and 9. In the case when the invention is used in a vehicle where power is transmitted by a chain or belt, such as a bicycle, moped, or motorcycle, one planetary gear unit 6 is mounted onto the output shaft 3 as shown in FIGS. 8 and 9. This planetary gear 6 is used to reverse the rotating motion of the shaft 3 which rotates in the direction opposite to the direction of the pedals.

Figure 12:
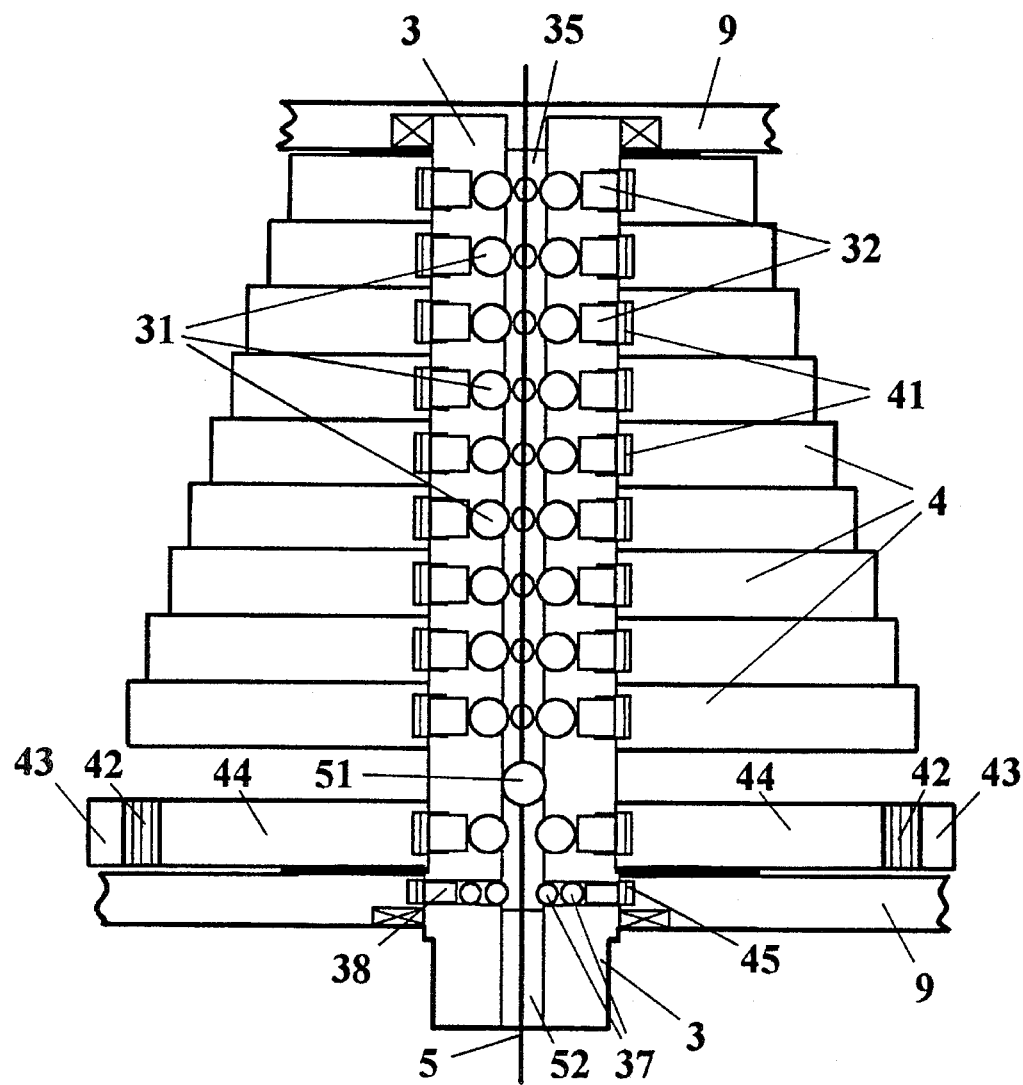
FIG. 12 is the cut-away view of the invention having a reverse gear as well as parking and neutral positions.

As shown in FIG. 12, the present invention can be designed with one reverse gear for use in a passenger car, truck and similar type of vehicles. This design provides one gear 44 mounted onto the shall 3 which serves as a sun gear for four plant gear 42 and one ring gear 43. The ring gear 43 meshes with the corresponding drive gear 2 and transmits the force onto the sun gear 44 over the plant gear 42. Since all gears 44, 42, and 43 are allowed to rotate, the rotating direction of the sun gear 44 is opposite to the rotating direction of the ring gear 43. Consequently, when the sun gear 44 is engaged its rotating direction is opposite from the direction produced by any other engaged gear 4 and will drive the vehicle in the opposite (reverse) direction.

The design shown in FIG. 12 also provides a "parking" position wherein the output shaft 3 is locked and prevented to rotate. The intermediate balls 37 and roll-keys 38 are provided in line with the housing wall 9 while the notches 45 are indented inside the housing wall 9. The shaft longitudinal opening 35 is extended into the area which is located within the housing wall 9 in order to enable the shifting plunger 51 movement between the intermediate balls 37. As also shown in FIG. 12, this design provides an unproportionally wide area between the reverse gear 44 and the first driven gear 4 in order to create the space wherein the shifting plunger 51 will not engage any of the intermediate balls 31 or 37 and enable an idle ("neutral") position.

According to the process of the present invention, when a rotating force is exerted on the driving shaft 1 it causes all of the drive gears 2 to rotate at the same speed as the shaft 1. Each of the drive gears 2 has a different diameter and its teeth mesh with the teeth of the corresponding driven gear 4. The drive gear 2 with the smallest diameter meshes with the driven gear 4 which has the largest diameter. Each following drive gear 2 has a larger diameter and each following driven gear 4 has a smaller diameter ending with the largest drive gear 2 meshing with the smallest driven gear 4 as shown in FIGS. 1, 8, and 9.

When the shifting cord 8 is pulled it rotates the command unit 7 which, further, causes the guidance cord 5 to drive the shifting plunger 51 through the opening 35. When the shifting plunger 51 is driven inside the area where one set of the intermediate balls 31 is extending into the opening 35 as shown in FIG. 3, the plunger 51 forces the balls 31 outwards from the opening 35 as shown in FIGS. 2 and 4. In response, the balls 31 force the roll-keys 32 outwards into the notches 41 thereby providing the firm contact between the shaft 3 and the driven gear 4. Consequently, the rotating force exerted on the driven gear 4 by the corresponding drive gear 2 is transmitted on the shaft 3 which rotates at the same speed as the driven gear 4.

As soon as the shifting plunger 51 is forced from the engaging position as shown in FIGS. 2 and 4, the retracting spring 36 forces the roll-keys 32 and the intermediate balls 31 back into the idle position as shown in FIG. 3. In response, the corresponding gear 4 is disengaged from the shaft 3 and rotates freely without having the influence on the shaft 3 rotation. Each of the driven gears 4 is either engaged or disengaged according to the above described procedure. The shifting plunger always engages the driven gear 4 which is next to the driven gear 4 which was disengaged right before. Except for the driven gears 4 which are located at two ends of the shaft 3, the plunger 51 can engage either a higher or smaller ratio gear 4 next to the gear 4 which was engaged right before the plunger's 51 movement. Except for one particular set of intermediate balls 31 and roll-keys 32 which is engaged at a certain instant, all other sets of balls 31 and roll-keys 32 are retracted into idle positions by force of the retracting springs 36 which counterweight the centrifugal force exerted on the balls 31 and roll-keys 32.

Any of the driven gears 4 which is engaged by the roll-keys 32 transmits the force on the output shaft 3 and causes the shaft 3 to rotate at the speed determined by the ratios of the corresponding drive 2 and driven gear 4. By moving the shifting plunger 51 through the opening 35 the output shaft 3 is caused to rotate faster, slower or at the same speed as the drive shaft 1. The rotating direction of the output shaft 3 can be reversed by using either added planetary gear 6 as shown in FIGS. 8 and 9, or by adding an additional gear which will mesh with the gear provided at one end of the shaft 3. The above described process wherein the shifting plunger 51 is slid through the output shaft 3 (thereby engaging the different driven gear 4) enables the transmission to have a wide variety of output ratios without having a complicated mechanical design and excessive volume.

In the case of a transmission shown in FIG. 12 which is designed to have a reverse gear, the process of engaging and disengaging the reverse driven gear 44 is performed identically as described above. The only difference is that the reverse gear 44 rotates in the opposite direction as the result of having the ring gear 43 and satellite gears 42 mounted between the driven gear 44 and the corresponding drive gear 2. This design also provides the possibility for locking the transmission into a "parking" position. When the shifting plunger 51 is pulled into the position closest to the housing wall 9, it displaces the intermediate balls 37 and the roll-keys 38 into the notches 45 which are indented in the housing wall 9 as shown in FIG. 12. This causes the output shaft 3 to be locked with the housing wall 9 thereby preventing the output shaft 3 to rotate in any direction. Since the output shaft 3 has solid connections with a vehicle's wheels this will result in locking of the wheels.

According to the process of the present invention for the design shown in FIG. 12, an idle ("neutral") position exists when the shifting plunger 51 is located inside the shaft opening 35 located between the reverse gear 44 and the first driven gear 4. As shown in FIG. 12, this causes the output shaft 3 to be completely disengaged from the power source so that the rotation of the driven gears 4 or the reverse gear 44 does not have any effect with respect to the rotation of the shaft 3 and vice versa.

As is obvious from the above description, the present invention discloses the transmission which will enable a significant improvement regarding the power transmission. Its compact and relatively simple design provides more gears and smoother power flow resulting in smaller energy loss without increasing the transmission's volume or making it less comfortable to use.

It is to be understood that the present invention has been described in relation to the particular embodiment, herein chosen for the purpose of illustration, and that the claims are intended to cover all changes and modifications, apparent to those skilled in the art, which do not constitute departure from the scope and spirit of the invention.

What is claimed is:

1. A transmission for changing a ratio between a power input shaft operating speed and a power output shaft operating speed, the transmission comprising:

a housing;

a drive shaft installed in the housing, the drive shaft having first and second ends;

a set of drive gears, wherein each of said drive gears has a different diameter and wherein each of said drive gears is mounted on and firmly fastened to the drive shaft;

an output shaft installed in the housing parallel to the drive shaft, the output shaft having first and second ends;

a plurality of driven gears, wherein each of said driven gears is independently mounted on the output shaft and positioned to constantly mesh with one of said drive gears and wherein each of the driven gears has an inner circular opening;

a plurality of indented sections provided within each of said inner circular openings;

an opening extending longitudinally through the output shaft, said longitudinal opening having first and second ends;

a cylindrical retainer enclosing the first end of the longitudinal opening in the output shaft, said retainer having an opening extending longitudinally through the retainer;

a shifting plunger being slidably received within the opening in the output shaft for alternately engaging the driven gears;

a guidance cord for driving the shifting plunger, said guidance cord firmly connected to the shifting plunger and extending through the longitudinal opening in the driven shaft and the longitudinal opening in the cylindrical retainer;

a plurality of first laterally spaced openings within the driven shaft, the first openings being arranged so as to provide one set of the identical openings within an area corresponding to each of the driven gears proximate to the longitudinal opening of the driven shaft and having open communications with the longitudinal opening of the driven shaft;

a plurality of second laterally spaced openings within the driven shaft, the second openings being arranged so as to provide one set of the identical openings within the area corresponding to each of the driven gears and providing open communications between the first laterally spaced openings and the inner circular openings of the driven gears;

a plurality of intermediate balls for alternately engaging the driven gears when displaced by the shifting plunger, the intermediate balls being slidably received within the first laterally spaced openings and arranged so as to provide one set of the intermediate balls within the area corresponding to each of the driven gears;

a plurality of roll-keys being slidably received within the second laterally spaced openings for providing a connection between the intermediate balls and the indented sections within the inner circular openings of the driven gears and thereby enabling alternate engaging of the driven gears when displaced by the intermediate balls, said roll-keys being arranged so as to provide one set of the roll-keys within the area corresponding to each of the driven gears;

a plurality of circular springs for retracting the roll-keys and the intermediate balls, said circular springs being mounted on the roll-keys and arranged so as to provide at least a set of two circular springs on each set of the roll-keys;

a command unit for driving the guidance cord, said command unit having a connection with the guidance cord;

a shifting cord for operating the command unit, said shifting cord connected to the command unit.

2. The transmission of claim 1, wherein the drive gears are arranged so as to form the set of drive gears which gradually decrease from the gear with the largest diameter to the gear with the smallest diameter.

3. The transmission of claim 1, wherein each of the driven gears has a different diameter and wherein the diameters of the driven gears gradually increase from the gear with the smallest diameter to the gear with the largest diameter.

4. The transmission of claim 1, wherein the driven gear having the smallest diameter meshes with the drive gear having the largest diameter.

5. The transmission of claim 1, wherein the first end of the drive shaft and the first end office output shaft are extending through the housing.

6. A transmission for changing a ratio between a power input shaft operating speed and a driving wheel operating speed, the transmission comprising:

a housing;

a drive shaft installed in the housing, the drive shaft having first and second ends wherein both said ends are extending through the housing;

a set of drive gears having different diameters mounted on and firmly attached to the drive shaft;

an output shaft installed in the housing parallel to the drive shaft, the driven shaft having first and second ends wherein the first end is extending through the housing;

a planetary gear mounted onto the extending first end of the output shaft;

a plurality of driven gears independently mounted on the output shaft and positioned so as to enable each of said driven gears to constantly mesh with one of said drive gears, each of the driven gears having an inner circular opening;

a plurality of indented sections provided within each inner circular opening of the driven gears;

an opening extending longitudinally through the output shaft, said longitudinal opening having first and second ends;

a cylindrical retainer enclosing the first end of the opening in the output shaft, the retainer having an opening extending longitudinally through the retainer, the retainer being in a solid connection with the housing;

a shifting plunger being slidably received within the longitudinal opening in the output shaft for alternately engaging the driven gears;

a guidance cord for driving the shifting plunger, the guidance cord being in a firm connection with the shifting plunger and extending through the first and second ends of the output shaft;

a plurality of first laterally spaced openings within the output shaft, the first openings being arranged so as to provide one set of the identical openings within an area corresponding to each of the driven gears proximate to the longitudinal opening in the output shaft and having open communications with the longitudinal opening of the output shaft;

a plurality of intermediate balls for alternately engaging the driven gears when displaced by the shifting plunger, the intermediate balls being slidably received within said first laterally spaced openings and arranged so as to provide one set of the intermediate balls within the area corresponding to each of the driven gears;

a plurality of second laterally spaced openings within the driven shaft, the second openings being arranged so as to provide one set of the identical openings within the area corresponding to each of the driven gears and providing open communications between the first laterally spaced openings and the inner circular openings of the driven gears when the driven gears are mounted on the output shaft;

a plurality of roll-keys being slidably received within said second laterally spaced openings for providing a communication between the intermediate balls and the indented sections within the inner circular openings of the driven gears thereby alternately engaging the driven gears when displaced by the intermediate balls, the roll-keys being arranged so as to provide one set of the roll-keys within the area corresponding to each of the driven gears;

a plurality of circular springs for retracting the roll-keys and the intermediate balls, the circular springs being mounted on the roll-keys and arranged so as to provide at least a set of two circular springs on each set of the roll-keys;

a command unit for driving the guidance cord, the command unit having a connection with the guidance cord;

a shifting cord for operating the command unit, the shifting cord having first and second ends wherein the first end is connected to the command unit.

7. The transmission of claim 6, wherein each of the drive gears has a different diameter and wherein the diameters of the drive gears gradually increase from the gear mounted proximate to the first end of the drive shaft to the gear mounted proximate to the second end of the drive shaft.

8. The transmission of claim 6, wherein each of the driven gears has a different diameter and wherein the diameters of the driven gears gradually decrease from the gear mounted proximate to the first end of the output shaft to the gear mounted proximate to the second end of the output shaft.

9. The transmission of claim 6, wherein the second end of the shifting cord is connected to an electric motor.

10. A power transmitting unit for changing rotating direction and varying operating speed between driving and driven members, the power transmitting unit comprising:

- a housing, the housing having a plurality of circular openings;
- a drive shaft installed in the housing, the drive shaft having first and second ends wherein the first end extends out of the housing;
- a set of drive gears having different diameters firmly mounted onto the drive shaft;
- a output shaft installed in the housing parallel to the driven shaft, the output shaft having first and second ends wherein the first end extends out of the housing;
- a plurality of driven gears rotatably mounted on the output shaft and positioned so as to enable one of the driven gears to permanently mesh with one of the drive gears, each of the driven gears having an inner circular opening;
- a plurality of indented sections provided within each inner circular opening of the driven gears;
- a plurality of indented sections provided within the circular opening of the housing proximate to the first end of the output shaft;
- at least one set of planet gears mounted onto the driven gear proximate to the first end of the output shaft;
- a ring gear mounted onto the set of planet gears for reversing a rotating direction of said driven gear proximate to the first end of the output shaft;
- an opening extending longitudinally through the driven shaft, the longitudinal opening having first and second ends;
- a cylindrical retainer enclosing the first end of the longitudinal opening in the driven shaft, the retainer having an longitudinal opening extending through the retainer;
- a shifting plunger being slidably received within the longitudinal opening in the driven shaft for alternately engaging the driven gears and locking the driven shaft to the indented sections within the housing;
- a guidance cord for driving the shitting plunger, the guidance cord firmly connected to the shifting plunger and extending through the longitudinal opening in the driven shaft and longitudinal opening in the cylindrical retainer;
- a plurality of first laterally spaced openings within the driven shaft, the first openings being arranged so as to provide one set of the identical openings within an area corresponding to each of the driven gears and said indented sections in the housing, the first openings located proximate to the longitudinal opening of the driven shaft and having open communications with the longitudinal opening of the driven shaft;
- a plurality of second laterally spaced openings within the driven shaft, the second openings being arranged so as to provide one set of the identical openings within the area corresponding to each of the driven gears and providing open communications between the first laterally spaced openings and the inner circular openings of the driven gears and the housing;
- a plurality of intermediate balls for alternately engaging the driven gears, the intermediate balls being slidably received within the first laterally spaced openings and arranged so as to provide one set of the intermediate balls within the area corresponding to each of the driven gears and the area of the indented sections in the housing;
- a plurality of roll-keys being slidably received within the second laterally spaced openings for providing a communication between the intermediate balls and the indented sections within the inner circular openings of the driven gears thereby alternately engaging the driven gears, the roll-keys being arranged so as to provide one set of the roll-keys within the area corresponding to each of the driven gears and the area of the indented sections in the housing;
- a plurality of roll-keys being slidably received within the second laterally spaced openings for providing a communication between the intermediate balls and the indented sections within said circular opening in the housing proximate to the first end of the output shaft thereby locking the output shaft to the housing;
- a plurality of circular springs for retracting all of said roll-keys and said intermediate balls, the circular springs being mounted on the roll-keys and arranged so as to provide at least a set of two circular springs on each set of the roll-keys;
- a command unit for driving the guidance cord, the command firmly connected with the guidance cord;
- a shifting cord for operating the command unit, the shifting cord having first and second ends wherein the first end is connected to the command unit.

11. The power transmitting unit of claim 10, wherein each of the drive gears has a different diameter and wherein the diameters of the drive gears gradually decrease from the gear with the largest diameter to the gear with the smallest diameter.

12. The power transmitting unit of claim 10, wherein each of the driven gears has a different diameter and wherein the diameters of the driven gears gradually decrease from the gear with the largest diameter to the gear with the smallest diameter.

13. The power transmitting unit of claim 10, wherein the drive gear having the smallest diameter meshes with the driven gear having the largest diameter.

* * * * *